Patented Aug. 15, 1933

1,922,591

UNITED STATES PATENT OFFICE 1,922,591

PROCESS FOR MANUFACTURING CAUSTIC SODA

Paul Krassa, Santiago, Chile

No Drawing. Application October 19, 1931, Serial No. 569,841, and in Austria November 4, 1930

15 Claims. (Cl. 23—184)

It is known (see Lunge, Handbuch der Soda-industrie) that a mixture of ferric oxide and sodium nitrate gives at an elevated temperature and in the presence of air and water vapours sodium ferrite $Na_2Fe_2O_4$, oxides of nitrogen being evolved. The sodium ferrite can be decomposed by water whereby an aqueous solution of caustic soda and insoluble ferric oxide are obtained. The latter may be used for decomposing a fresh quantity of sodium nitrate or it may be advantageously used as a pigment being in a state of very fine subdivision.

Now it has been found that the raw material for the ferric oxide is preferably natural limonite owing to its contents in amorphous silica or amorphous dioxide of silicon which has been found to essentially facilitate the reaction. If desired amorphous silica or amorphous dioxide of silicon may be added as a catalyzer, but quartz is detrimental to the reaction. As the decomposition of the reaction product is rendered difficult by the presence of silica, the decomposition with water is effected in this case under pressure at a temperature of above 100° centigrade. This way of carrying the process into practice offers the further advantage that solutions of caustic soda of a higher concentration are obtained.

Also artificial mixtures of ferric oxide with colloidal or amorphous silica of great surface development and eventual minor further additions corresponding to the composition of limonite may be used with valuable results.

The decomposition of the sodium nitrate may be advantageously carried out in a continuous process. For this purpose the mixture of sodium nitrate and ferric oxide is first brought into a pasty condition by the addition of water and preferably after having been dried, passed in a pulverulent or more or less coarsely granular state through a furnace heated from the outside, a current of air, if desired moistened with water, being passed simultaneously through the furnace.

The continuous operation secures not only the advantage of a greater output but permits to obtain the oxides of nitrogen in a uniform concentration, which is very advantageous for their subsequent absorption.

For carrying this process into practice for instance a revolving horizontal or slightly inclined cylinder, a revolving retort such as used for the manufacture of cement, may be employed which, however, is heated from the outside. It may be found advantageous to force the material through the furnace by means of feed screw or other suitable feeding mechanism. The current of air may flow through the furnace in the same direction as the mixture of ferric oxide and sodium nitrate is passed therethrough or the current of air may be passed through the furnace in counter current to the said mixture. In the former case the said mixture may be introduced in a moist state into the furnace so that the addition of water vapour to the air may be dispensed with. When operating on the counter current principle the air required may be heated prior to entering the furnace by the products of reaction escaping from the furnace these being simultaneously cooled. Thereby a better heat economy is secured.

Instead of a revolving furnace also a shaft furnace may be used to which the mixture is supplied in a granular form. In this case the current of air preferably flows in counter current to the granular mixture.

The operating temperature is preferably 600° to 750° centigrade. The quantity of air is preferably so controlled, that the oxides of nitrogen show a concentration of more than 2%.

Instead of air, also other gases, for instance combustion gases, may be employed. If used in a hot state the heating may be partly or wholly an internal one. The oxides of nitrogen obtained by the process may be converted into nitric acid in the well known manner or may be utilized for the manufacture of nitrates or nitrites.

Furthermore it has been found that the reaction above described is greatly facilitated by heating the reaction mass at a pressure below atmospheric pressure; by this expedient the temperature and the duration of the reaction may be materially reduced.

Examples (1) A mixture of 276 parts by weight of sodium nitrate and 726 parts by weight of pure ferric oxide were heated to a temperature of 650° centigrade, and per hour and one kilogramme of the mixture, about 2.1 cubic metres of air mixed with vapour of water were passed through this mixture during about four hours. The output in caustic soda was about 86.0% of the theoretically possible output.

(2) 1000 parts by weight of a mixture of sodium nitrate and limonite containing, as found by analysis, 33.1% of sodium nitrate, 60.1% of ferric oxide and 6.8% of silica were heated to a temperature of 650° centigrade for two hours during which time, per hour and one kilogramme of the mixture, 1.2 cubic metres of a mixture of air and vapour of water were passed through the first named mixture. Notwithstanding the much shorter duration of the reaction the output in caustic soda is 93.8% of the theoretically possible output.

(3) 1000 parts by weight of a mixture of sodium nitrate and magnetite, containing 28.8% of sodium nitrate, 70% of ferric oxide and 1.2% of silica were heated to a temperature of 680° centigrade for two hours and per hour and one kilogramme of the mixture, 1.96 cubic metres of a mixture of air and vapour of water were passed through the first named mixture during the said period of two hours; the output in caustic soda was about 45.7% of the theoretically possible output.

(4) In each of three comparative tests 1000 parts by weight of a mixture of 27.6% of sodium nitrate and 72.4% pure ferric oxide were heated for 20 minutes to a temperature of 600° Centigrade while passing therethrough, per hour and one kilogramme of the mixture, 2.4 cubic metres of a mixture of air and vapour of water. In the first test the pure mixture of sodium nitrate and ferric oxide was used, in the second test 2.5% of quartz and in the third test 2.5% of precipitated and dried silica were added. The output in caustic soda was:

|   | Percent |
|---|---|
| In the first test | 9.1 |
| In the second test | 8.6 |
| In the third test | 23.6 |

(5) 1000 parts by weight of a mixture of 30.1% sodium nitrate and 69.9% dried limonite were heated in a revolving furnace to a temperature of 570 to 650° Centigrade whilst being repeatedly passed through the furnace. The total period of heating was 3½ hours and 0.120 cubic metres of air were passed through the charge per hour and one kilogramme of the charge. The output in caustic soda was 94%.

While mixtures containing magnetite or pure ferric oxide melt, even in the revolving furnace notwithstanding an addition of quartz thereto, and firmly adhere to the walls of the furnace, the mixtures made of limonite or with an addition of amorphous silica or amorphous dioxide of silicon sinter only slightly and may be readily removed from the furnace.

(6) A mixture of sodium nitrate and limonite was heated in a stationary furnace to increasing temperature while at a pressure of 115 mm mercury column air is taken in through a capillary tube. Oxides of nitrogen begin to evolve at a temperature of less than 300° centigrade. The temperature is slowly increased to 600° centigrade. The output in caustic soda is 92%.

The foregoing examples have been given to demonstrate methods of operation without confining myself to these particular conditions; for example, the relation between steam and air and the total quantity of gases, may be varied according to requirements, and, again, it is possible to operate without using steam. The latter is especially important to secure a higher grade of the nitric acid obtained by the absorption in water.

What I claim is:

1. In the process of manufacturing caustic soda from a mixture of ferric oxide and sodium nitrate the step of adding to the said mixture amorphous dioxide of silicon of great surface development.

2. A process of manufacturing caustic soda comprising the steps of mixing sodium nitrate and ferric oxide incorporating into the said mixture amorphous silicon dioxide, heating the mixed ingredients in the presence of oxygen containing gases and steam and decomposing the solid residue thus obtained by water.

3. A process of manufacturing caustic soda comprising the steps of mixing sodium nitrate and limonite which contains amorphous dioxide of silicon of great surface development, heating the mixed ingredients in the presence of oxygen containing gases and steam and decomposing the solid residue thus obtained by water.

4. A process of manufacturing caustic soda comprising the steps of mixing sodium nitrate and ferric oxide incorporating into the said mixture amorphous silicon dioxide heating the mixed ingredients in the presence of atmospheric air and steam and decomposing the solid residue thus obtained by water.

5. A process of manufacturing caustic soda comprising the steps of mixing sodium nitrate and limonite which contains amorphous dioxide of silicon of great surface development, heating the mixed ingredients in the presence of atmospheric air and steam and decomposing the solid residue thus obtained by water.

6. A process of manufacturing caustic soda comprising the steps of mixing sodium nitrate and ferric oxide incorporating into the said mixture amorphous silicon dioxide, heating the mixed ingredients in the presence of oxygen containing gases and steam, at a pressure below atmospheric pressure and decomposing the solid residue thus obtained by water.

7. A process of manufacturing caustic soda comprising the steps of mixing sodium nitrate and ferric oxide, incorporating into the said mixture amorphous silicon dioxide, bringing the mixture into a subdivided form, passing it through a furnace, heating the mixed ingredients in the said furnace in the presence of oxygen containing gases and steam and decomposing the solid residue thus obtained by water.

8. A process of manufacturing caustic soda comprising the steps of mixing sodium nitrate and ferric oxide, incorporating into the said mixture amorphous silicon dioxide, bringing the mixture into a subdivided form, passing it through a furnace and passing simultaneously through the same furnace a current of oxygen containing gases and steam, heating the said subdivided mixture and the said current and decomposing the solid residue thus obtained by water.

9. A process of manufacturing caustic soda comprising the steps of mixing sodium nitrate and ferric oxide, incorporating into the said mixture amorphous silicon dioxide, bringing the mixture into a subdivided form and passing it through a furnace, passing simultaneously through the same furnace a current of oxygen containing gases and steam, heating the said furnace, whereby the said subdivided mixture and the said current are heated, and decomposing the solid residue thus obtained by water.

10. A process of manufacturing caustic soda comprising the steps of mixing sodium nitrate and ferric oxide, incorporating into the said mixture amorphous silicon dioxide, bringing the mixture into a subdivided form, passing it through a furnace and passing simultaneously through the same furnace a current of oxygen containing gases and steam, heating the said furnace, whereby the said subdivided mixture and the said current are heated to a temperature of 600 to 750° centigrade, and decomposing the solid residue thus obtained by water.

11. A process of manufacturing caustic soda comprising the steps of mixing sodium nitrate and ferric oxide, incorporating into the said mixture amorphous silicon dioxide, heating the ingredients mixed in the presence of oxygen containing gases and steam, the quantity of the said gases being such that the concentration of the oxides of nitrogen in the gaseous reaction products, is higher than 2%.

12. A process of manufacturing caustic soda comprising the steps of mixing sodium nitrate and ferric oxide, incorporating into the said mixture amorphous silicon dioxide, heating the mixed ingredients in the presence of oxygen containing gases and steam, and decomposing the solid residue thus obtained by water under pressure at a temperature of more than 100° centigrade.

13. A process of manufacturing caustic soda comprising the steps of mixing sodium nitrate and ferric oxide incorporating into the said mixture amorphous silicon dioxide, heating the mixed ingredients in the presence of oxygen containing gases and decomposing the solid residue thus obtained by water.

14. A process of manufacturing caustic soda comprising the steps of mixing sodium nitrate and limonite which contains amorphous dioxide of silicon of great surface development, heating the mixed ingredients in the presence of atmospheric air and decomposing the solid residue thus obtained by water.

15. A process of manufacturing caustic soda comprising the steps of mixing sodium nitrate and ferric oxide, incorporating into the said mixture amorphous silicon dioxide, bringing the mixture into a subdivided form, passing it through a furnace and passing simultaneously through the same furnace a current of oxygen containing gases, heating the said subdivided mixture and the said current and decomposing the solid residue thus obtained by water.

PAUL KRASSA.